US011103012B2

(12) United States Patent
Sur et al.

(10) Patent No.: US 11,103,012 B2
(45) Date of Patent: Aug. 31, 2021

(54) SATELLITE NAVIGATION FOR AN AEROSOL DELIVERY DEVICE

(71) Applicant: RAI STRATEGIC HOLDINGS, INC., Winston-Salem, NC (US)

(72) Inventors: Rajesh Sur, Winston Salem, NC (US); Eric T. Hunt, Pfafftown, NC (US); Stephen B. Sears, Siler City, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 722 days.

(21) Appl. No.: 15/354,610

(22) Filed: Nov. 17, 2016

(65) Prior Publication Data

US 2018/0136338 A1 May 17, 2018

(51) Int. Cl.

| | |
|---|---|
| ***A24F 40/53*** | (2020.01) |
| ***A24F 40/60*** | (2020.01) |
| ***A24F 40/65*** | (2020.01) |
| ***B65D 83/72*** | (2006.01) |
| ***G01S 19/14*** | (2010.01) |
| ***G01S 19/42*** | (2010.01) |
| ***G01S 19/52*** | (2010.01) |
| ***H02J 7/35*** | (2006.01) |

(Continued)

(52) U.S. Cl.

CPC .............. *A24F 40/53* (2020.01); *A24F 40/60* (2020.01); *A24F 40/65* (2020.01); *B65D 83/72* (2013.01); *B65D 83/75* (2013.01); *G01S 19/14* (2013.01); *G01S 19/42* (2013.01); *G01S 19/52* (2013.01); *H02J 7/35* (2013.01); *A24F 40/10* (2020.01)

(58) Field of Classification Search

CPC .................... G01S 19/14; G01S 19/16; A24F 47/002–008; A24F 40/50; A24F 40/53; A24F 40/60; A24F 40/65

See application file for complete search history.

(56) References Cited

U.S. PATENT DOCUMENTS

| | | | |
|---|---|---|---|
| 1,771,366 | A | 7/1930 | Wyss et al. |
| 2,057,353 | A | 10/1936 | Whittemore, Jr. |

(Continued)

FOREIGN PATENT DOCUMENTS

| | | |
|---|---|---|
| AU | 276250 | 7/1965 |
| CA | 2 641 869 | 5/2010 |

(Continued)

*Primary Examiner* — Cassi J Galt

(74) *Attorney, Agent, or Firm* — Womble Bond Dickinson (US) LLP

(57) ABSTRACT

An aerosol delivery device is provided that includes at least one housing enclosing a reservoir configured to retain an aerosol precursor composition and a heating element controllable to activate and vaporize components of the aerosol precursor composition. The aerosol delivery device also includes an antenna configured to receive radio signals from satellites of a satellite navigation system, and convert the radio signals to corresponding electronic signals and a satellite navigation receiver module configured to receive the corresponding electronic signals and determine a position of the aerosol delivery device based thereon, and output a message that indicates the position so determined. And the aerosol delivery device includes a microprocessor configured to receive the message and control operation of at least one functional element of the aerosol delivery device based on the position indicated thereby.

18 Claims, 3 Drawing Sheets

(51) Int. Cl.
*B65D 83/14* (2006.01)
*A24F 40/10* (2020.01)

(56) References Cited

U.S. PATENT DOCUMENTS 2,104,266 A 1/1938 McCormick
3,200,819 A 8/1965 Gilbert
4,284,089 A 8/1981 Ray
4,303,083 A 12/1981 Burruss, Jr.
4,735,217 A 4/1988 Gerth et al.
4,848,374 A 7/1989 Chard et al.
4,907,606 A 3/1990 Lilja et al.
4,922,901 A 5/1990 Brooks et al.
4,945,931 A 8/1990 Gori
4,947,874 A 8/1990 Brooks et al.
4,947,875 A 8/1990 Brooks et al.
4,986,286 A 1/1991 Roberts et al.
5,019,122 A 5/1991 Clearman et al.
5,042,510 A 8/1991 Curtiss et al.
5,060,671 A 10/1991 Counts et al.
5,093,894 A 3/1992 Deevi et al.
5,144,962 A 9/1992 Counts et al.
5,249,586 A 10/1993 Morgan et al.
5,261,424 A 11/1993 Sprinkel, Jr.
5,322,075 A 6/1994 Deevi et al.
5,353,813 A 10/1994 Deevi et al.
5,369,723 A 11/1994 Counts et al.
5,372,148 A 12/1994 McCafferty et al.
5,388,574 A 2/1995 Ingebrethsen et al.
5,408,574 A 4/1995 Deevi et al.
5,468,936 A 11/1995 Deevi et al.
5,498,850 A 3/1996 Das
5,515,842 A 5/1996 Ramseyer et al.
5,530,225 A 6/1996 Hajaligol
5,564,442 A 10/1996 MacDonald et al.
5,649,554 A 7/1997 Sprinkel et al.
5,666,977 A 9/1997 Higgins et al.
5,687,746 A 11/1997 Rose et al.
5,726,421 A 3/1998 Fleischhauer et al.
5,727,571 A 3/1998 Meiring et al.
5,743,251 A 4/1998 Howell et al.
5,799,663 A 9/1998 Gross et al.
5,819,756 A 10/1998 Mielordt
5,865,185 A 2/1999 Collins et al.
5,865,186 A 2/1999 Volsey, II
5,878,752 A 3/1999 Adams et al.
5,894,841 A 4/1999 Voges
5,934,289 A 8/1999 Watkins et al.
5,954,979 A 9/1999 Counts et al.
5,967,148 A 10/1999 Harris et al.
6,040,560 A 3/2000 Fleischhauer et al.
6,053,176 A 4/2000 Adams et al.
6,089,857 A 7/2000 Matsuura et al.
6,095,153 A 8/2000 Kessler et al.
6,125,853 A 10/2000 Susa et al.
6,155,268 A 12/2000 Takeuchi
6,164,287 A 12/2000 White
6,196,218 B1 3/2001 Voges
6,196,219 B1 3/2001 Hess et al.
6,222,484 B1 * 4/2001 Seiple .................. B63C 9/0005
342/357.55
6,598,607 B2 7/2003 Adiga et al.
6,601,776 B1 8/2003 Oljaca et al.
6,615,840 B1 9/2003 Fournier et al.
6,688,313 B2 2/2004 Wrenn et al.
6,772,756 B2 8/2004 Shayan
6,803,545 B2 10/2004 Blake et al.
6,854,461 B2 2/2005 Nichols
6,854,470 B1 2/2005 Pu
7,117,867 B2 10/2006 Cox et al.
7,293,565 B2 11/2007 Griffin et al.
7,513,253 B2 4/2009 Kobayashi et al.
7,775,459 B2 8/2010 Martens, III et al.
7,832,410 B2 11/2010 Hon
7,845,359 B2 12/2010 Montaser
7,896,006 B2 3/2011 Hamano et al.
8,127,772 B2 3/2012 Montaser
8,314,591 B2 11/2012 Terry et al.
8,365,742 B2 2/2013 Hon
8,402,976 B2 3/2013 Fernando et al.
8,499,766 B1 8/2013 Newton
8,528,569 B1 9/2013 Newton
8,550,069 B2 10/2013 Alelov
8,666,344 B2 * 3/2014 Baba ....................... G01S 1/047
342/357.25
8,851,081 B2 10/2014 Fernando et al.
8,897,628 B2 * 11/2014 Conley ................. A24F 47/008
392/386
9,155,337 B2 * 10/2015 Duncan ................. A24F 47/004
2002/0146242 A1 10/2002 Vieira
2003/0226837 A1 12/2003 Blake et al.
2004/0118401 A1 6/2004 Smith et al.
2004/0129280 A1 7/2004 Woodson et al.
2004/0200488 A1 10/2004 Felter et al.
2004/0226568 A1 11/2004 Takeuchi et al.
2005/0016550 A1 1/2005 Katase
2006/0016453 A1 1/2006 Kim
2006/0196518 A1 9/2006 Hon
2007/0074734 A1 4/2007 Braunshteyn et al.
2007/0102013 A1 5/2007 Adams et al.
2007/0215167 A1 9/2007 Crooks et al.
2008/0085103 A1 4/2008 Beland et al.
2008/0092912 A1 4/2008 Robinson et al.
2008/0257367 A1 10/2008 Paterno et al.
2008/0276947 A1 11/2008 Martzel
2008/0302374 A1 12/2008 Wengert et al.
2009/0095311 A1 4/2009 Hon
2009/0095312 A1 4/2009 Herbrich et al.
2009/0126745 A1 5/2009 Hon
2009/0188490 A1 7/2009 Hon
2009/0230117 A1 9/2009 Fernando et al.
2009/0272379 A1 11/2009 Thorens et al.
2009/0283103 A1 11/2009 Nielsen et al.
2009/0320863 A1 12/2009 Fernando et al.
2010/0043809 A1 2/2010 Magnon
2010/0083959 A1 4/2010 Siller
2010/0200006 A1 8/2010 Robinson et al.
2010/0229881 A1 9/2010 Hearn
2010/0242974 A1 9/2010 Pan
2010/0307518 A1 12/2010 Wang
2010/0313901 A1 12/2010 Fernando et al.
2010/0317336 A1 * 12/2010 Ferren ............... H04M 1/72577
455/419
2011/0005535 A1 1/2011 Xiu
2011/0011396 A1 1/2011 Fang
2011/0036363 A1 2/2011 Urtsev et al.
2011/0036365 A1 2/2011 Chong et al.
2011/0094523 A1 4/2011 Thorens et al.
2011/0126848 A1 6/2011 Zuber et al.
2011/0155153 A1 6/2011 Thorens et al.
2011/0155718 A1 6/2011 Greim et al.
2011/0168194 A1 7/2011 Hon
2011/0228753 A1 * 9/2011 Polito .................. G01S 5/0221
370/338
2011/0265806 A1 11/2011 Alarcon et al.
2011/0309157 A1 12/2011 Yang et al.
2011/0309976 A1 * 12/2011 Leclercq ................. G01S 19/34
342/357.25
2012/0042885 A1 2/2012 Stone et al.
2012/0060853 A1 3/2012 Robinson et al.
2012/0111347 A1 5/2012 Hon
2012/0132643 A1 5/2012 Choi et al.
2012/0227752 A1 9/2012 Alelov
2012/0231464 A1 9/2012 Yu et al.
2012/0260927 A1 10/2012 Liu
2012/0279512 A1 11/2012 Hon
2012/0318882 A1 12/2012 Abehasera
2013/0037041 A1 2/2013 Worm et al.
2013/0056013 A1 3/2013 Terry et al.
2013/0081625 A1 4/2013 Rustad et al.
2013/0081642 A1 4/2013 Safari
2013/0192619 A1 8/2013 Tucker et al.
2013/0255702 A1 10/2013 Griffith, Jr. et al.
2013/0306084 A1 11/2013 Flick

(56) References Cited

U.S. PATENT DOCUMENTS

| | | | | |
|---|---|---|---|---|
| 2013/0319439 | A1 | 12/2013 | Gorelick et al. | |
| 2013/0340750 | A1 | 12/2013 | Thorens et al. | |
| 2013/0340775 | A1 | 12/2013 | Juster et al. | |
| 2014/0000638 | A1 | 1/2014 | Sebastian et al. | |
| 2014/0060554 | A1 | 3/2014 | Collett et al. | |
| 2014/0060555 | A1 | 3/2014 | Chang et al. | |
| 2014/0096781 | A1 | 4/2014 | Sears et al. | |
| 2014/0096782 | A1* | 4/2014 | Ampolini | A24F 47/008 131/328 |
| 2014/0109921 | A1 | 4/2014 | Chen | |
| 2014/0157583 | A1 | 6/2014 | Ward et al. | |
| 2014/0203963 | A1* | 7/2014 | Shimada | G04R 40/02 342/357.51 |
| 2014/0209105 | A1 | 7/2014 | Sears et al. | |
| 2014/0253144 | A1 | 9/2014 | Novak et al. | |
| 2014/0261408 | A1 | 9/2014 | DePiano et al. | |
| 2014/0261486 | A1 | 9/2014 | Potter et al. | |
| 2014/0261487 | A1 | 9/2014 | Chapman et al. | |
| 2014/0261495 | A1 | 9/2014 | Novak et al. | |
| 2014/0270727 | A1 | 9/2014 | Ampolini et al. | |
| 2014/0270729 | A1 | 9/2014 | DePiano et al. | |
| 2014/0270730 | A1 | 9/2014 | DePiano et al. | |
| 2014/0345631 | A1 | 11/2014 | Bowen et al. | |
| 2015/0007838 | A1 | 1/2015 | Fernando et al. | |
| 2015/0053217 | A1 | 2/2015 | Steingraber et al. | |
| 2015/0181945 | A1* | 7/2015 | Tremblay | A24F 47/008 131/328 |
| 2016/0037826 | A1 | 2/2016 | Hearn et al. | |
| 2016/0219932 | A1 | 8/2016 | Glaser | |
| 2016/0324217 | A1 | 11/2016 | Cameron | |
| 2017/0034674 | A1* | 2/2017 | Radhakrishnan | H04W 4/90 |

FOREIGN PATENT DOCUMENTS

| | | | |
|---|---|---|---|
| CN | 1541577 | | 11/2004 |
| CN | 2719043 | | 8/2005 |
| CN | 200997909 | | 1/2008 |
| CN | 101116542 | | 2/2008 |
| CN | 101176805 | | 5/2008 |
| CN | 201379072 | | 1/2010 |
| CN | 205284997 | U | 6/2016 |
| DE | 10 2006 004 4 | | 8/2007 |
| DE | 102006041042 | | 3/2008 |
| DE | 20 2009 010 400 | | 11/2009 |
| EP | 0 295 122 | | 12/1988 |
| EP | 0 430 566 | | 6/1991 |
| EP | 0 845 220 | | 6/1998 |
| EP | 1 618 803 | | 1/2006 |
| EP | 2 316 286 | | 5/2011 |
| GB | 2469850 | | 11/2010 |
| KR | 101523088 | B1 | 5/2015 |
| WO | WO 1997/48293 | | 12/1997 |
| WO | WO 2003/034847 | | 5/2003 |
| WO | WO 2004/043175 | | 5/2004 |
| WO | WO 2004/080216 | | 9/2004 |
| WO | WO 2005/099494 | | 10/2005 |
| WO | WO 2007/078273 | | 7/2007 |
| WO | WO 2007/131449 | | 11/2007 |
| WO | WO 2009/105919 | | 9/2009 |
| WO | WO 2009/155734 | | 12/2009 |
| WO | WO 2010/003480 | | 1/2010 |
| WO | WO 2010/045670 | | 4/2010 |
| WO | WO 2010/073122 | | 7/2010 |
| WO | WO 2010/118644 | | 10/2010 |
| WO | WO 2010/140937 | | 12/2010 |
| WO | WO 2011/010334 | | 1/2011 |
| WO | WO 2012/072762 | | 6/2012 |
| WO | WO 2012/100523 | | 8/2012 |
| WO | WO 2013/089551 | | 6/2013 |
| WO | 2014199233 | A2 | 12/2014 |
| WO | 2015073854 | A1 | 5/2015 |

* cited by examiner

SATELLITE NAVIGATION FOR AN AEROSOL DELIVERY DEVICE

TECHNOLOGICAL FIELD

The present disclosure relates to aerosol delivery devices such as smoking articles, and more particularly to aerosol delivery devices that may utilize electrically generated heat for the production of aerosol (e.g., smoking articles commonly referred to as electronic cigarettes). The smoking articles may be configured to heat an aerosol precursor, which may incorporate materials that may be made or derived from, or otherwise incorporate tobacco, the precursor being capable of forming an inhalable substance for human consumption.

BACKGROUND

Many devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous alternative smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 8,881,737 to Collett et al., U.S. Pat. App. Pub. No. 2013/0255702 to Griffith Jr. et al., U.S. Pat. App. Pub. No. 2014/0000638 to Sebastian et al., U.S. Pat. App. Pub. No. 2014/0096781 to Sears et al., U.S. Pat. App. Pub. No. 2014/0096782 to Ampolini et al., U.S. Pat. App. Pub. No. 2015/0059780 to Davis et al., and U.S. patent application Ser. No. 15/222,615 to Watson et al., filed Jul. 28, 2016, all of which are incorporated herein by reference. See also, for example, the various embodiments of products and heating configurations described in the background sections of U.S. Pat. No. 5,388,594 to Counts et al. and U.S. Pat. No. 8,079,371 to Robinson et al., which are incorporated by reference in their entireties.

However, it may be desirable to provide aerosol delivery devices with improved electronics such as may extend usability of the devices.

BRIEF SUMMARY

The present disclosure relates to aerosol delivery devices, methods of forming such devices, and elements of such devices. The present disclosure includes, without limitation, the following example implementations.

Some example implementations provide an aerosol delivery device comprising at least one housing enclosing a reservoir configured to retain an aerosol precursor composition; a heating element controllable to activate and vaporize components of the aerosol precursor composition; an antenna configured to receive radio signals from satellites of a satellite navigation system, and convert the radio signals to corresponding electronic signals; a satellite navigation receiver module configured to receive the corresponding electronic signals and determine a position of the aerosol delivery device based thereon, and output a message that indicates the position so determined; and a microprocessor configured to receive the message and control operation of at least one functional element of the aerosol delivery device based on the position indicated thereby, wherein the satellite navigation receiver module and microprocessor are embodied by distinct integrated circuits coupled by at least one conductor onto which the message is output by the satellite navigation receiver module and from which the message is received by the microprocessor.

In some example implementations of the aerosol delivery device of the preceding or any subsequent example implementation, or any combination thereof, the satellite navigation receiver module being configured to determine the position of the aerosol delivery device includes being configured to determine the position, and a velocity and time at the aerosol delivery device, and wherein the message output by the satellite navigation receiver module and received by the microprocessor indicates the position, and the velocity and time, the microprocessor being configured to control operation of the at least one functional element based on the position, and the velocity and time indicated by the message.

In some example implementations of the aerosol delivery device of any preceding or any subsequent example implementation, or any combination thereof, the satellite navigation receiver module is further configured to output a position available signal that is distinct from the message, the position available signal being output to an indicator to cause the indicator to provide a user-perceptible feedback that indicates availability of the position of the aerosol delivery device.

In some example implementations of the aerosol delivery device of any preceding or any subsequent example implementation, or any combination thereof, the control component being configured to control operation of the at least one functional element includes being configured to control an indicator to provide a user-perceptible feedback that In some example implementations of the aerosol delivery device of any preceding or any subsequent example implementation, or any combination thereof, the aerosol delivery device further comprises a communication interface configured to enable establishment of or connection to a wireless personal area network (WPAN) that includes a computing device, wherein the microprocessor being configured to control operation of the at least one functional element includes being configured to cause the communication interface to wirelessly communicate the position of the aerosol delivery device to the computing device configured to control operation of at least one functional element of the computing device based on the position.

In some example implementations of the aerosol delivery device of any preceding or any subsequent example implementation, or any combination thereof, the computing device being configured to control operation of the at least one functional element of the computing device includes being configured to control an indicator of the computing device to provide a user-perceptible feedback that indicates the position of the aerosol delivery device.

In some example implementations of the aerosol delivery device of any preceding or any subsequent example implementation, or any combination thereof, the aerosol delivery device further comprises a communication interface configured to enable connection to a wireless local area network (WLAN), and communication with a service platform over at least one network including the WLAN, wherein the microprocessor being configured to control operation of the at least one functional element includes being configured to cause the communication interface to wirelessly communicate the position of the aerosol delivery device to the service platform from which the position is accessible to a computing device configured to control operation of at least one functional element of the computing device based on the position.

In some example implementations of the aerosol delivery device of any preceding or any subsequent example implementation, or any combination thereof, the aerosol delivery device further comprises power harvesting circuitry configured to receive and harvest power from the corresponding electronic signals to power or charge a power source configured to power at least the satellite navigation receiver module and microprocessor.

Some example implementations provide a control body coupled or coupleable with a cartridge to form an aerosol delivery device, the cartridge including a reservoir configured to retain an aerosol precursor composition, and equipped with a heating element controllable to activate and vaporize components of the aerosol precursor composition, the control body comprising: a housing; and within the housing, an antenna configured to receive radio signals from satellites of a satellite navigation system, and convert the radio signals to corresponding electronic signals; a satellite navigation receiver module configured to receive the corresponding electronic signals and determine a position of the aerosol delivery device based thereon, and output a message that indicates the position so determined; and a microprocessor configured to receive the message and control operation of at least one functional element of the control body or aerosol delivery device based on the position indicated thereby, wherein the satellite navigation receiver module and microprocessor are embodied by distinct integrated circuits coupled by at least one conductor onto which the message is output by the satellite navigation receiver module and from which the message is received by the microprocessor.

In some example implementations of the control body of any preceding or any subsequent example implementation, or any combination thereof, the satellite navigation receiver module being configured to determine the position of the aerosol delivery device includes being configured to determine the position, and a velocity and time at the aerosol delivery device, and wherein the message output by the satellite navigation receiver module and received by the microprocessor indicates the position, and the velocity and time, the microprocessor being configured to control operation of the at least one functional element based on the position, and the velocity and time indicated by the message.

In some example implementations of the control body of any preceding or any subsequent example implementation, or any combination thereof, the satellite navigation receiver module is further configured to output a position available signal that is distinct from the message, the position available signal being output to an indicator to cause the indicator to provide a user-perceptible feedback that indicates availability of the position of the aerosol delivery device.

In some example implementations of the control body of any preceding or any subsequent example implementation, or any combination thereof, the control component being configured to control operation of the at least one functional element includes being configured to control an indicator to provide a user-perceptible feedback that indicates the position of the aerosol delivery device.

In some example implementations of the control body of any preceding or any subsequent example implementation, or any combination thereof, a communication interface configured to enable establishment of or connection to a wireless personal area network (WPAN) that includes a computing device, wherein the microprocessor being configured to control operation of the at least one functional element includes being configured to cause the communication interface to wirelessly communicate the position of the aerosol delivery device to a computing device configured to control operation of at least one functional element of the computing device based on the location.

In some example implementations of the control body of any preceding or any subsequent example implementation, or any combination thereof, the computing device being configured to control operation of the at least one functional element of the computing device includes being configured to control an indicator of the computing device to provide a user-perceptible feedback that indicates the position of the aerosol delivery device.

In some example implementations of the control body of any preceding or any subsequent example implementation, or any combination thereof, the control body further comprises a communication interface configured to enable connection to a wireless local area network (WLAN), and communication with a service platform over at least one network including the WLAN, wherein the microprocessor being configured to control operation of the at least one functional element includes being configured to cause the communication interface to wirelessly communicate the position of the aerosol delivery device to the service platform from which the position is accessible to a computing device configured to control operation of at least one functional element of the computing device based on the position.

In some example implementations of the control body of any preceding or any subsequent example implementation, or any combination thereof, the control body further comprises power harvesting circuitry configured to receive and harvest power from the corresponding electronic signals to power or charge a power source configured to power at least the satellite navigation receiver module and microprocessor.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described the disclosure in the foregoing general terms, reference will now be made to the accompanying drawings, which are not necessarily drawn to scale, and wherein:

DETAILED DESCRIPTION

Figure 1:
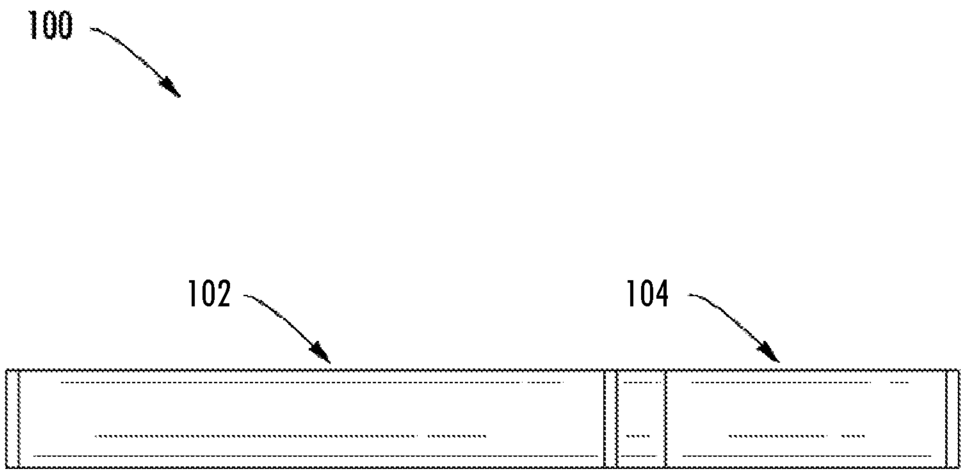
FIG. 1 illustrates a side view of an aerosol delivery device including a cartridge coupled to a control body, according to an example implementation of the present disclosure.

The present disclosure will now be described more fully hereinafter with reference to example implementations thereof. These example implementations are described so that this disclosure will be thorough and complete, and will fully convey the scope of the disclosure to those skilled in the art. Indeed, the disclosure may be embodied in many different forms and should not be construed as limited to the implementations set forth herein; rather, these implementations are provided so that this disclosure will satisfy applicable legal requirements. As used in the specification and the appended claims, the singular forms "a," "an," "the" and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As described hereinafter, example implementations of the present disclosure relate to aerosol delivery systems. Aerosol delivery systems according to the present disclosure use electrical energy to heat a material (preferably without combusting the material to any significant degree) to form an inhalable substance; and components of such systems have the form of articles most preferably are sufficiently compact to be considered hand-held devices. That is, use of components of preferred aerosol delivery systems does not result in the production of smoke in the sense that aerosol results principally from by-products of combustion or pyrolysis of tobacco, but rather, use of those preferred systems results in the production of vapors resulting from volatilization or vaporization of certain components incorporated therein. In some example implementations, components of aerosol delivery systems may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery systems may provide many of the sensations (e.g., inhalation and exhalation rituals, types of tastes or flavors, organoleptic effects, physical feel, use rituals, visual cues such as those provided by visible aerosol, and the like) of smoking a cigarette, cigar or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

Aerosol delivery systems of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

Aerosol delivery systems of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing or the elongated housing can be formed of two or more separable bodies. For example, an aerosol delivery device can comprise an elongated shell or body that can be substantially tubular in shape and, as such, resemble the shape of a conventional cigarette or cigar. In one example, all of the components of the aerosol delivery device are contained within one housing. Alternatively, an aerosol delivery device can comprise two or more housings that are joined and are separable. For example, an aerosol delivery device can possess at one end a control body comprising a housing containing one or more reusable components (e.g., an accumulator such as a rechargeable battery and/or supercapacitor, and various electronics for controlling the operation of that article), and at the other end and removably coupleable thereto, an outer body or shell containing a disposable portion (e.g., a disposable flavor-containing cartridge).

Aerosol delivery systems of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microprocessor, individually or as part of a microcontroller), a heater or heat generation member (e.g., an electrical resistance heating element or other component, which alone or in combination with one or more further elements may be commonly referred to as an "atomizer"), an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined airflow path through the article such that aerosol generated can be withdrawn therefrom upon draw).

More specific formats, configurations and arrangements of components within the aerosol delivery systems of the present disclosure will be evident in light of the further disclosure provided hereinafter. Additionally, the selection and arrangement of various aerosol delivery system components can be appreciated upon consideration of the commercially-available electronic aerosol delivery devices, such as those representative products referenced in background art section of the present disclosure. Further information regarding formats, configurations and arrangements of components within the aerosol delivery devices of the present disclosure, as well as commercially-available electronic aerosol delivery devices, may be found in U.S. patent application Ser. No. 15/291,771 to Sur et al., filed Oct. 12, 2016, which is incorporated herein by reference.

In various examples, an aerosol delivery device can comprise a reservoir configured to retain the aerosol precursor composition. The reservoir particularly can be formed of a porous material (e.g., a fibrous material) and thus may be referred to as a porous substrate (e.g., a fibrous substrate).

A fibrous substrate useful as a reservoir in an aerosol delivery device can be a woven or nonwoven material formed of a plurality of fibers or filaments and can be formed of one or both of natural fibers and synthetic fibers. For example, a fibrous substrate may comprise a fiberglass material. In particular examples, a cellulose acetate material can be used. In other example implementations, a carbon material can be used. A reservoir may be substantially in the form of a container and may include a fibrous material included therein.

FIG. 1 illustrates a side view of an aerosol delivery device 100 including a control body 102 and a cartridge 104, according to various example implementations of the present disclosure. In particular, FIG. 1 illustrates the control body and the cartridge coupled to one another. The control body and the cartridge may be detachably aligned in a functioning relationship. Various mechanisms may connect the cartridge to the control body to result in a threaded engagement, a press-fit engagement, an interference fit, a magnetic engagement or the like. The aerosol delivery device may be substantially rod-like, substantially tubular shaped, or substantially cylindrically shaped in some example implementations when the cartridge and the control body are in an assembled configuration. The aerosol delivery device may also be substantially rectangular or rhomboidal in cross-section, which may lend itself to greater compatibility with a substantially flat or thin-film power source, such as a power source including a flat battery. The cartridge and control body may include separate, respective housings or outer bodies, which may be formed of any of a number of different materials. The housing may be formed of any suitable, structurally-sound material. In some examples, the housing may be formed of a metal or alloy, such as stainless steel, aluminum or the like. Other suitable materials include various plastics (e.g., polycarbonate), metal-plating over plastic, ceramics and the like.

In some example implementations, one or both of the control body 102 or the cartridge 104 of the aerosol delivery device 100 may be referred to as being disposable or as being reusable. For example, the control body may have a replaceable battery or a rechargeable battery, rechargeable solid state battery, rechargeable super capacitor and thus may be combined with any type of recharging technology, including connection to a typical wall outlet, connection to a car charger (i.e., a cigarette lighter receptacle), connection to a computer, such as through a universal serial bus (USB) cable or connector, connection to a photovoltaic cell (sometimes referred to as a solar cell), GaAs solar cell or solar panel of solar cells, or connection to a RF-to-DC converter. Further, in some example implementations, the cartridge may comprise a single-use cartridge, as disclosed in U.S. Pat. No. 8,910,639 to Chang et al., which is incorporated herein by reference.

Figure 2:
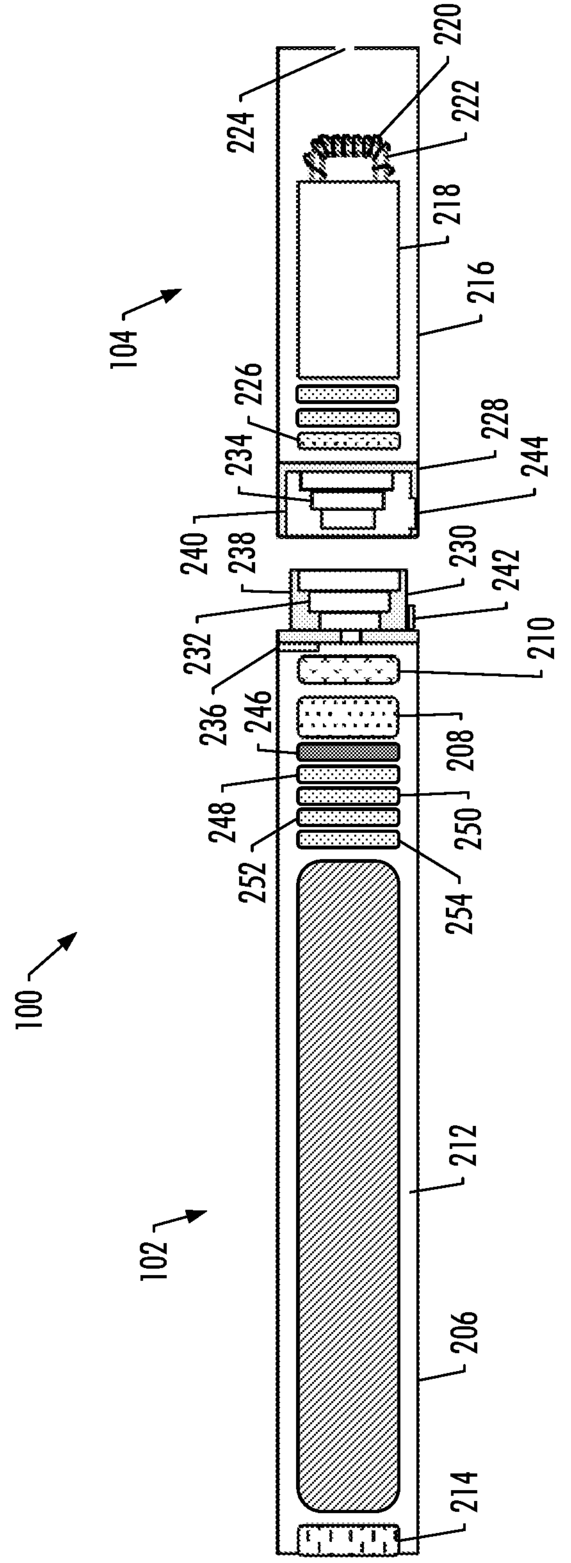
FIG. 2 is a partially cut-away view of the aerosol delivery device according to various example implementations.

FIG. 2 more particularly illustrates the aerosol delivery device 100, in accordance with some example implementations. As seen in the cut-away view illustrated therein, again, the aerosol delivery device can comprise a control body 102 and a cartridge 104 each of which include a number of respective components. The components illustrated in FIG. 2 are representative of the components that may be present in a control body and cartridge and are not intended to limit the scope of components that are encompassed by the present disclosure. As shown, for example, the control body can be formed of a control body shell 206 that can include a control component 208 (e.g., a microprocessor, individually or as part of a microcontroller), a flow sensor 210, a power source 212 and one or more light-emitting diodes (LEDs) 214, quantum dot LEDs and such components can be variably aligned. The power source may include, for example, a battery (single-use or rechargeable), lithium-ion battery (LiB), solid-state battery (SSB), rechargeable thin-film SSB, rechargeable supercapacitor or the like, or some combination thereof. Some examples of a suitable power source are provided in U.S. patent application Ser. No. 14/918,926 to Sur et al., filed Oct. 21, 2015, which is incorporated herein by reference. The LED may be one example of a suitable visual indicator with which the aerosol delivery device may be equipped. Other indicators such as audio indicators (e.g., speakers), haptic indicators (e.g., vibration motors) or the like can be included in addition to or as an alternative to visual indicators such as the LED, quantum dot enabled LEDs.

The cartridge 104 can be formed of a cartridge shell 216 enclosing a reservoir 218 configured to retain the aerosol precursor composition, and including a heater 222 (sometimes referred to as a heating element). In various configurations, this structure may be referred to as a tank; and accordingly, the terms "cartridge," "tank" and the like may be used interchangeably to refer to a shell or other housing enclosing a reservoir for aerosol precursor composition, and including a heater.

As shown, in some examples, the reservoir 218 may be in fluid communication with a liquid transport element 220 adapted to wick or otherwise transport an aerosol precursor composition stored in the reservoir housing to the heater 222. In some examples, a valve may be positioned between the reservoir and heater, and configured to control an amount of aerosol precursor composition passed or delivered from the reservoir to the heater.

Various examples of materials configured to produce heat when electrical current is applied therethrough may be employed to form the heater 222. The heater in these examples may be a resistive heating element such as a wire coil, micro heater or the like. Example materials from which the heating element may be formed include Kanthal (FeCrAl), Nichrome, stainless steel, Molybdenum disilicide ($MoSi_2$), molybdenum silicide (MoSi), Molybdenum disilicide doped with Aluminum ($Mo(Si,Al)_2$), graphite and graphite-based materials (e.g., carbon-based foams and yarns) and ceramics (e.g., positive or negative temperature coefficient ceramics). Example implementations of heaters or heating members useful in aerosol delivery devices according to the present disclosure are further described below, and can be incorporated into devices such as illustrated in FIG. 2 as described herein.

An opening 224 may be present in the cartridge shell 216 (e.g., at the mouthend) to allow for egress of formed aerosol from the cartridge 104.

The cartridge 104 also may include one or more electronic components 226, which may include an integrated circuit, a memory component (e.g., EEPROM, flash memory), a sensor, or the like. The electronic components may be adapted to communicate with the control component 208 and/or with an external device by wired or wireless means. The electronic components may be positioned anywhere within the cartridge or a base 228 thereof.

Although the control component 208 and the flow sensor 210 are illustrated separately, it is understood that various electronic components including the control component and the flow sensor may be combined on an electronic printed circuit board (PCB) that supports and electrically connects the electronic components. Further, the PCB may be positioned horizontally relative the illustration of FIG. 1 in that the PCB can be lengthwise parallel to the central axis of the control body. In some examples, the air flow sensor may comprise its own PCB or other base element to which it can be attached. In some examples, a flexible PCB may be utilized. A flexible PCB may be configured into a variety of shapes, include substantially tubular shapes. In some examples, a flexible PCB may be combined with, layered onto, or form part or all of a heater substrate.

The control body 102 and the cartridge 104 may include components adapted to facilitate a fluid engagement therebetween. As illustrated in FIG. 2, the control body can include a coupler 230 having a cavity 232 therein. The base 228 of the cartridge can be adapted to engage the coupler and can include a projection 234 adapted to fit within the cavity. Such engagement can facilitate a stable connection between the control body and the cartridge as well as establish an electrical connection between the power source 212 and control component 208 in the control body and the heater 222 in the cartridge. Further, the control body shell 206 can include an air intake 236, which may be a notch in the shell where it connects to the coupler that allows for passage of ambient air around the coupler and into the shell where it then passes through the cavity of the coupler and into the cartridge through the projection 234.

A coupler and a base useful according to the present disclosure are described in U.S. Pat. App. Pub. No. 2014/0261495 to Novak et al., which is incorporated herein by reference. For example, the coupler 230 as seen in FIG. 2 may define an outer periphery 238 configured to mate with an inner periphery 240 of the base 228. In one example the inner periphery of the base may define a radius that is substantially equal to, or slightly greater than, a radius of the outer periphery of the coupler. Further, the coupler may define one or more protrusions 242 at the outer periphery configured to engage one or more recesses 244 defined at the inner periphery of the base. However, various other examples of structures, shapes and components may be employed to couple the base to the coupler. In some examples the connection between the base of the cartridge 104 and the coupler of the control body 102 may be substantially permanent, whereas in other examples the connection therebetween may be releasable such that, for example, the control body may be reused with one or more additional cartridges that may be disposable and/or refillable.

The aerosol delivery device 100 may be substantially rod-like or substantially tubular shaped or substantially cylindrically shaped in some examples. In other examples, further shapes and dimensions are encompassed—e.g., a rectangular or triangular cross-section, multifaceted shapes, or the like.

The reservoir 218 illustrated in FIG. 2 can be a container or can be a fibrous reservoir, as presently described. For example, the reservoir can comprise one or more layers of nonwoven fibers substantially formed into the shape of a tube encircling the interior of the cartridge shell 216, in this example. An aerosol precursor composition can be retained in the reservoir. Liquid components, for example, can be sorptively retained by the reservoir. The reservoir can be in fluid connection with the liquid transport element 220. The liquid transport element can transport the aerosol precursor composition stored in the reservoir via capillary action to the heater 222 that is in the form of a metal wire coil in this example. As such, the heater is in a heating arrangement with the liquid transport element. Example implementations of reservoirs and transport elements useful in aerosol delivery devices according to the present disclosure are further described below, and such reservoirs and/or transport elements can be incorporated into devices such as illustrated in FIG. 2 as described herein. In particular, specific combinations of heating members and transport elements as further described below may be incorporated into devices such as illustrated in FIG. 2 as described herein.

In use, when a user draws on the aerosol delivery device 100, airflow is detected by the flow sensor 210, and the heater 222 is activated to vaporize components of the aerosol precursor composition. Drawing upon the mouthend of the aerosol delivery device causes ambient air to enter the air intake 236 and pass through the cavity 232 in the coupler 230 and the central opening in the projection 234 of the base 228. In the cartridge 104, the drawn air combines with the formed vapor to form an aerosol. The aerosol is whisked, aspirated or otherwise drawn away from the heater and out the opening 224 in the mouthend of the aerosol delivery device.

In some examples, the aerosol delivery device 100 may include a number of additional software-controlled functions. For example, the aerosol delivery device may include a power-source protection circuit configured to detect power-source input, loads on the power-source terminals, and charging input. The power-source protection circuit may include short-circuit protection, under-voltage lock out and/or over-voltage charge protection, battery electrolyte compensation, battery temperature compensation. The aerosol delivery device may also include components for ambient temperature measurement, and its control component 208 may be configured to control at least one functional element to inhibit power-source charging—particularly of any battery—if the ambient temperature is below a certain temperature (e.g., 0° C.) or above a certain temperature (e.g., 45° C.) prior to start of charging or during charging.

Power delivery from the power source 212 may vary over the course of each puff on the device 100 according to a power control mechanism. The device may include a "long puff" safety timer such that in the event that a user or component failure (e.g., flow sensor 210) causes the device to attempt to puff continuously, the control component 208 may control at least one functional element to terminate the puff automatically after some period of time (e.g., four seconds). Further, the time between puffs on the device may be restricted to less than a period of time (e.g., 100 seconds). A watchdog safety timer may automatically reset the aerosol delivery device if its control component or software running on it becomes unstable and does not service the timer within an appropriate time interval (e.g., eight seconds). Further safety protection may be provided in the event of a defective or otherwise failed flow sensor 210, such as by permanently disabling the aerosol delivery device in order to prevent inadvertent heating. A puffing limit switch may deactivate the device in the event of a pressure sensor fail causing the device to continuously activate without stopping after the four second maximum puff time.

The aerosol delivery device 100 may include a puff tracking algorithm configured for heater lockout once a defined number of puffs has been achieved for an attached cartridge (based on the number of available puffs calculated in light of the e-liquid charge in the cartridge). The aerosol delivery device may include a sleep, standby or low-power mode function whereby power delivery may be automatically cut off after a defined period of non-use. Further safety protection may be provided in that all charge/discharge cycles of the power source 212 may be monitored by the control component 208 over its lifetime. After the power source has attained the equivalent of a predetermined number (e.g., 200) of full discharge and full recharge cycles, it may be declared depleted, and the control component may control at least one functional element to prevent further charging of the power source.

The various components of an aerosol delivery device according to the present disclosure can be chosen from components described in the art and commercially available. Examples of batteries that can be used according to the disclosure are described in U.S. Pat. App. Pub. No. 2010/0028766 to Peckerar et al., which is incorporated herein by reference.

The aerosol delivery device 100 can incorporate the sensor 210 or another sensor or detector for control of supply of electric power to the heater 222 when aerosol generation is desired (e.g., upon draw during use). As such, for example, there is provided a manner or method of turning off power to the heater when the aerosol delivery device is not be drawn upon during use, and for turning on power to actuate or trigger the generation of heat by the heater during draw. Additional representative types of sensing or detection mechanisms, structure and configuration thereof, components thereof, and general methods of operation thereof, are described in U.S. Pat. No. 5,261,424 to Sprinkel, Jr., U.S. Pat. No. 5,372,148 to McCafferty et al., and PCT Pat. App. Pub. No. WO 2010/003480 to Flick, all of which are incorporated herein by reference.

The aerosol delivery device 100 most preferably incorporates the control component 208 or another control mechanism for controlling the amount of electric power to the heater 222 during draw. Representative types of electronic components, structure and configuration thereof, features thereof, and general methods of operation thereof, are described in U.S. Pat. No. 4,735,217 to Gerth et al., U.S. Pat. No. 4,947,874 to Brooks et al., U.S. Pat. No. 5,372,148 to McCafferty et al., U.S. Pat. No. 6,040,560 to Fleischhauer et al., U.S. Pat. No. 7,040,314 to Nguyen et al., U.S. Pat. No. 8,205,622 to Pan, U.S. Pat. App. Pub. No. 2009/0230117 to Fernando et al., U.S. Pat. App. Pub. No. 2014/0060554 to Collet et al., U.S. Pat. App. Pub. No. 2014/0270727 to Ampolini et al., and U.S. Pat. App. Pub. No. 2015/0257445 to Henry et al., all of which are incorporated herein by reference.

Representative types of substrates, reservoirs or other components for supporting the aerosol precursor are described in U.S. Pat. No. 8,528,569 to Newton, U.S. Pat. App. Pub. No. 2014/0261487 to Chapman et al., U.S. Pat. App. Pub. No. 2015/0059780 to Davis et al., and U.S. Pat. App. Pub. No. 2015/0216232 to Bless et al., all of which are incorporated herein by reference. Additionally, various wicking materials, and the configuration and operation of those wicking materials within certain types of electronic cigarettes, are set forth in U.S. Pat. App. Pub. No. 2014/0209105 to Sears et al., which is incorporated herein by reference.

The aerosol precursor composition, also referred to as a vapor precursor composition, may comprise a variety of components including, by way of example, a polyhydric alcohol (e.g., glycerin, propylene glycol or a mixture thereof), nicotine, tobacco, tobacco extract and/or flavorants. Representative types of aerosol precursor components and formulations also are set forth and characterized in U.S. Pat. No. 7,217,320 to Robinson et al. and U.S. Pat. Pub. Nos. 2013/0008457 to Zheng et al.; 2013/0213417 to Chong et al.; 2014/0060554 to Collett et al.; 2015/0020823 to Lipowicz et al.; and 2015/0020830 to Koller, as well as WO 2014/182736 to Bowen et al., and U.S. patent application Ser. No. 15/222,615 to Watson et al., filed Jul. 28, 2016, the disclosures of which are incorporated herein by reference. Other aerosol precursors that may be employed include the aerosol precursors that have been incorporated in the VUSE® product by R. J. Reynolds Vapor Company, the BLU™ product by Imperial Tobacco Group PLC, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

Additional representative types of components that yield visual cues or indicators may be employed in the aerosol delivery device 100, such as visual indicators and related components, audio indicators, haptic indicators and the like. Examples of suitable LED components, and the configurations and uses thereof, are described in U.S. Pat. No. 5,154,192 to Sprinkel et al., U.S. Pat. No. 8,499,766 to Newton, U.S. Pat. No. 8,539,959 to Scatterday, and U.S. Pat. App. Pub. No. 2015/0216233 to Sears et al., all of which are incorporated herein by reference.

Yet other features, controls or components that can be incorporated into aerosol delivery devices of the present disclosure are described in U.S. Pat. No. 5,967,148 to Harris et al., U.S. Pat. No. 5,934,289 to Watkins et al., U.S. Pat. No. 5,954,979 to Counts et al., U.S. Pat. No. 6,040,560 to Fleischhauer et al., U.S. Pat. No. 8,365,742 to Hon, U.S. Pat. No. 8,402,976 to Fernando et al., U.S. Pat. App. Pub. No. 2005/0016550 to Katase, U.S. Pat. App. Pub. No. 2010/0163063 to Fernando et al., U.S. Pat. App. Pub. No. 2013/0192623 to Tucker et al., U.S. Pat. App. Pub. No. 2013/0298905 to Leven et al., U.S. Pat. App. Pub. No. 2013/0180553 to Kim et al., U.S. Pat. App. Pub. No. 2014/0000638 to Sebastian et al., U.S. Pat. App. Pub. No. 2014/0261495 to Novak et al., and U.S. Pat. App. Pub. No. 2014/0261408 to DePiano et al., all of which are incorporated herein by reference.

As indicated above, the control component 208 includes a number of electronic components, and in some examples may be formed of a PCB. The electronic components may include a microprocessor or processor core, and a memory. In some examples, the control component may include a microcontroller with integrated processor core and memory, and may further include one or more integrated input/output peripherals. Examples of suitable microcontrollers include the MSP430G2x series microcontroller units (MCUs) from Texas Instruments. In some examples, the control component may be coupled to a communication interface 246 to enable wireless communication with one or more networks, computing devices or other appropriately-enabled devices.

Examples of suitable communication interfaces are disclosed in U.S. patent application Ser. No. 14/638,562 to Marion et al., filed Mar. 4, 2015, the content of which is incorporated herein by reference. In some examples, the control component includes a MCU with a built-in communication interface such as the CC3200 single chip wireless MCU from Texas Instruments. Examples of suitable manners according to which the aerosol delivery device may be configured to wirelessly communicate are disclosed in U.S. Pat. App. Pub. No. 2016/0007651 to Ampolini et al., and U.S. Pat. App. Pub. No. 2016/0219933 to Henry, Jr. et al., each of which is incorporated herein by reference.

In accordance with some example implementations, the control body 102 includes an antenna 248 and a satellite navigation receiver module 250 for determining a position of the aerosol delivery device 100, or more specifically the control body. More particularly, the antenna is configured to receive radio signals from satellites of a satellite navigation system, such as Global Positioning System (GPS), Global Navigation Satellite System (GLONASS), BeiDou Navigation Satellite System (BDS), Galileo and the like, and to convert the radio signals to corresponding electronic signals. The satellite navigation receiver module is then in turn configured to receive the corresponding electronic signals and determine a position of the control body or assembled aerosol delivery device based thereon. Examples of suitable satellite navigation receiver modules include those compatible with an appropriate satellite navigation system such as GPS, GLONASS, BDS, Galileo and the like. One particular example of a suitable satellite navigation receiver module is the TC6000GN-P1 GPS module from Global Navigation Systems—GNS GmbH.

In some examples, the satellite navigation receiver module 250 is configured to determine the position, and a velocity and time at the control body 102 of the aerosol delivery device. The discussion herein focuses more prominently on position, but it should be understood that references to the position may equally apply to the position, and the velocity and time.

The satellite navigation receiver module 250 is configured to output a message that indicates the position (or the position, and the velocity and time) of the control body 102. In at least some examples in which the control component 208 includes a microprocessor, the microprocessor is coupled to the satellite navigation receiver module 250 and configured to receive the message and control operation of at least one functional element of the aerosol delivery device or control body 100 thereof based on the position (or the position, and the velocity and time) indicated by the message. In accordance with example implementations, the satellite navigation receiver module and control component are embodied by distinct integrated circuits coupled by at least one conductor onto which the message is output by the satellite navigation receiver module and from which the message is received by the control component.

In some examples, the satellite navigation receiver module 250 is further configured to output a position available signal that is distinct from the message. In these examples, the position available signal is output to an indicator 252 (e.g., visual indicator, audio indicator, haptic indicator) to cause the indicator to provide a user-perceptible feedback (e.g., visual, audible, haptic feedback) that indicates availability of the position of the control body 102.

Functional element(s) of the aerosol delivery device 100 or control body 102 may be controlled in any of a number of different manners based on the position (or the position, and the velocity and time) of the control body. For example, the indicator 252 or another similar indicator may be controlled to provide a user-perceptible feedback that indicates the position of the control body.

In some examples, the control body 102 includes power harvesting circuitry 254 configured to receive and harvest power from the corresponding electronic signals from the antenna 248 to power or charge the power source 212, which is configured to power at least the satellite navigation receiver module 250 and microprocessor (control component 208). Examples of suitable power harvesting circuitries are disclosed in Priya, Shashank, and Daniel J. Inman, eds. Energy harvesting technologies. Vol. 21: 280-321. New York: Springer, 2009. Further examples of power harvesting circuits that may be employed include the power harvesting circuits that have been incorporated in the Powerharvester™ receiver products by Powercast™. Other examples of suitable power harvesting circuitry are disclosed in U.S. patent application Ser. No. 15/205,903 to Sur, filed Jul. 8, 2016, which is incorporated herein by reference.

Figure 3:
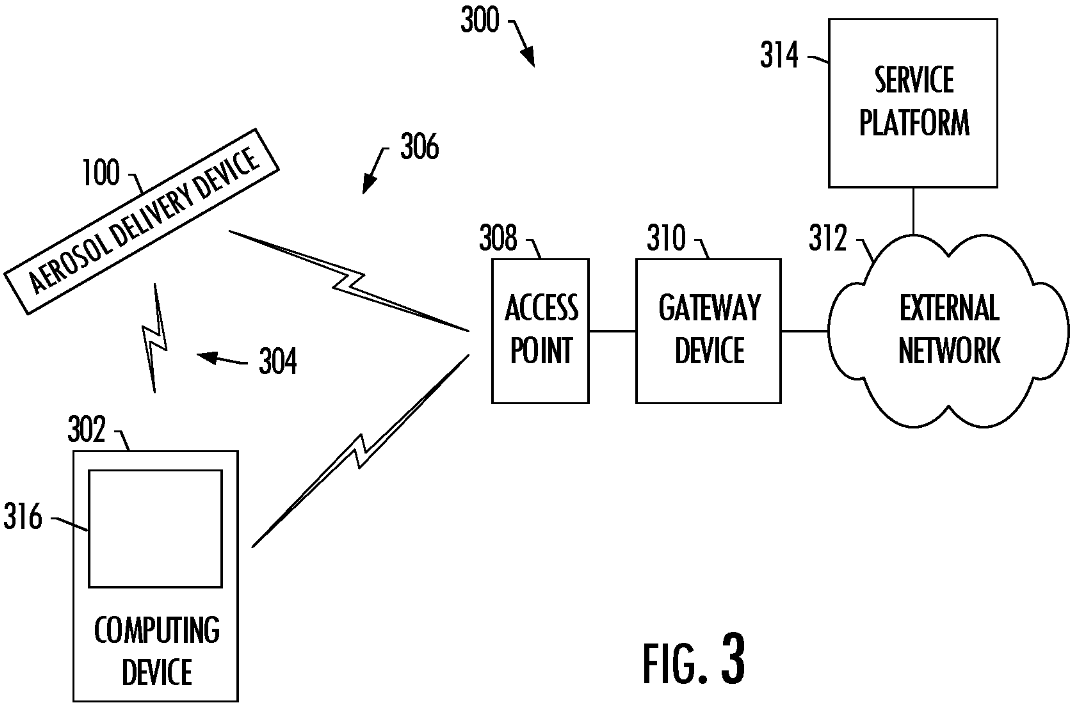
FIG. 3 illustrates a system including an aerosol delivery device in wireless communication with a computing device, according to various example implementations.

In some examples, in addition to or in lieu of control of the indicator 252, the position (or the position, and the velocity an time), may be wirelessly communicated from the aerosol delivery device 100 or control body 102 to an external computing device for control of its functional element(s). FIG. 3 illustrates a system 300 including an aerosol delivery device in wireless communication with a computing device 302 external to the aerosol delivery device (an external computing device), according to various example implementations. This computing device may also be embodied as a number of different devices, such as any of a number of different mobile computers. More particular examples of suitable mobile computers include portable computers (e.g., laptops, notebooks, tablet computers), mobile phones (e.g., cell phones, smartphones), wearable computers (e.g., smartwatches) and the like. In other examples, the computing device may be embodied as other than a mobile computer, such as in the manner of a desktop computer, server computer or the like.

In some examples, the communication interface 246 of the aerosol delivery device 100 is configured to enable establishment of or connection to a wireless personal area network (WPAN) 304 that includes the computing device 302. Examples of suitable WPAN technologies include those based on or specified by IEEE 802.15 standards, including Bluetooth, Bluetooth low energy (Bluetooth LE), ZigBee, infrared (e.g., IrDA), radio-frequency identification (RFID), Wireless USB and the like. Other examples of suitable WPAN technologies include Wi-Fi Direct, as well as certain other technologies based on or specified by IEEE 802.11 standards and that support direct device-to-device communication.

In some examples, the communication interface 246 of the aerosol delivery device 100 is configured to enable connection to a wireless local area network (WLAN) 306. Examples of suitable WLAN technologies include those based on or specified by IEEE 802.11 standards and marketed as Wi-Fi. The WLAN includes appropriate networking hardware, some of which may be integral and others of which may be separate and interconnected. As shown, for example, the WLAN includes a wireless access point 308 configured to permit wireless devices including the aerosol delivery device and computing device 302 to connect to the WLAN. As also shown, for example, the WLAN may include a gateway device 310 such as a residential gateway configured to connect the WLAN to an external computer network 312 such as a wide area network (WAN) like the Internet. In some examples, the wireless access point or gateway device may include an integrated router to which other systems or devices may be connected. The WLAN may also include other integral or separate and connected networking hardware, such as a network switch, hub, digital subscriber line (DSL) modem, cable modem or the like.

In some examples, the system 300 further includes a service platform 314, which may be embodied as a computer system accessible by the WLAN 304 or external network 310 (as shown). The service platform may include one or more servers, such as may be provided by one or more blade servers, a cloud computing infrastructure or the like. In some examples, the service platform is embodied as a distributed computing apparatus including multiple computing devices, such as may be used to provide a cloud computing infrastructure. And in these examples, the computing devices that form the service platform may be in communication with each other via a network such as the external network.

In some examples, the service platform 312 is accessible by the aerosol delivery device 100 over the WLAN 304 and external network 310, and configured to provide one or more services for the aerosol delivery device and perhaps other aerosol delivery devices. For example, the service platform may be operated by a manufacturer of an aerosol delivery device, a vendor of an aerosol delivery device or another entity with interest in the manufacture, distribution or maintenance of an aerosol delivery device. The service platform may enable a user to access and use various features, such as features for management of an aerosol delivery device, such as those described below.

Similar to the aerosol delivery device 100, in some examples, the service platform 312 is accessible by the computing device 302 over the WLAN 304 and external network 310, although the WLAN or external network may be different between the aerosol delivery device and computing device. The computing device may include or otherwise provide an installed application or other interface through which the service platform 114 may be accessible. This application or other interface may be or may be provided by a thin client and/or other client application, such as a web browser application through which a web page (e.g., service portal) provided by the service platform may be accessible. As another example, the application or other interface may be or may be provided by a dedicated application, such as a mobile app installed on a computing device embodied as a mobile computing device.

In some examples, the microprocessor is configured cause the communication interface 246 to wirelessly communicate the position of the control body 102 to the computing device 302 (over the WPAN 304). Additionally or alternatively, in some examples, the microprocessor is configured to cause the communication interface to wirelessly communicate the position of the control body to the service platform 314 (over the WLAN 306) from which the position is accessible to the computing device. In these examples, the computing device is configured to control operation of at least one functional element of the computing device based on the position. Similar to the aerosol delivery device, this may include control of an indicator 316 (e.g., visual indicator, audio indicator, haptic indicator) to provide a user-perceptible feedback (e.g., visual, audible, haptic feedback) that indicates the position.

In some examples, the microprocessor (control component 208) is configured to communicate with the service platform to not only enable remote user-perceptible feedback, but to further enable the computing device 302 to remotely control at least one functional element of the aerosol delivery device 100. For example, control of the functional element(s) includes control of the functional element(s) to alter a power state or a locked state of the aerosol delivery device, either based on or independent of the position of the aerosol delivery device. This may include, for example, turning the aerosol delivery device on or off, or unlocking (enabling) or locking (disabling) operation of the aerosol delivery device. A user of the computing device may therefore control the computing device, or the computing device may operate automatically, to remotely turn the aerosol delivery device off or lock its operation in instances in which the aerosol delivery device is lost or stolen.

In some examples in which the control body 102 is carried by a user or within a vehicle or other mobile machine, wireless communication of the position of the control body 102 further enables tracking the user or vehicle from the computing device 302. This may be particularly useful in a number of different contexts, such as for recovery of a lost or stolen aerosol delivery device 100 or vehicle. As a further extension, concepts described herein may also be applied to equipping packaging with a satellite navigation receiver module 250. This includes, for example, packaging for an aerosol delivery device, control body or cartridge 104, or other tobacco-related product, those position may thereby be tracked by a computing device to which the position may be wirelessly communicated. In an even more particular example, packaging for sensitive hybrid tobacco seeds may be equipped a satellite navigation receiver module to enable its position to be tracked to ensure safe delivery to its target destination.

The foregoing description of use of the article(s) can be applied to the various example implementations described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article(s) illustrated in FIGS. 1-3 or as otherwise described above may be included in an aerosol delivery device according to the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed, and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An aerosol delivery device comprising:

at least one housing configured to retain an aerosol precursor composition;

an antenna configured to receive radio signals from satellites of a satellite navigation system, and convert the radio signals to corresponding electronic signals;

a satellite navigation receiver module configured to receive the corresponding electronic signals and determine a position of the aerosol delivery device based thereon, and output a message that indicates the position so determined;

a communication interface configured to enable establishment of or connection to a wireless network that includes a computing device; and a control component configured to control the aerosol delivery device to produce an aerosol from the aerosol precursor composition;

wherein the control component comprises a microprocessor configured to receive the message and cause the communication interface to wirelessly communicate the position of the aerosol delivery device to the computing device, the microprocessor remotely controllable by the computing device to control operation of the aerosol delivery device based on the position as wirelessly communicated to the computing device.

2. The aerosol delivery device of claim 1, wherein the satellite navigation receiver module configured to determine the position of the aerosol delivery device includes the satellite navigation receiver module configured to determine the position, a velocity, and a time at the aerosol delivery device, and wherein the message output by the satellite navigation receiver module and received by the microprocessor indicates the position, the velocity and the time, and the microprocessor is configured to cause the communication interface to wirelessly communicate the position, the velocity and the time to the computing device.

3. The aerosol delivery device of claim 1, wherein the aerosol delivery device further comprises an indicator, and the satellite navigation receiver module is further configured to output a position available signal that is distinct from the message, the position available signal output to the indicator to cause the indicator to provide a user-perceptible feedback that indicates availability of the position of the aerosol delivery device.

4. The aerosol delivery device of claim 1, wherein the aerosol delivery device further comprises an indicator, and the control component is configured to control the indicator to provide a user-perceptible feedback that indicates the position of the aerosol delivery device.

5. The aerosol delivery device of claim 1, wherein the wireless network is a wireless personal area network (WPAN), and the communication interface is configured to enable establishment of or connection to the WPAN that includes the computing device.

6. The aerosol delivery device of claim 1, further comprising power harvesting circuitry configured to receive and harvest power from the corresponding electronic signals to power or charge a power source configured to power at least the satellite navigation receiver module and microprocessor.

7. A control body coupled or coupleable with a cartridge to form an aerosol delivery device, the cartridge configured to retain an aerosol precursor composition, the control body comprising:

a housing; and within the housing, an antenna configured to receive radio signals from satellites of a satellite navigation system, and convert the radio signals to corresponding electronic signals;

a satellite navigation receiver module configured to receive the corresponding electronic signals and determine a position of the control body based thereon, and output a message that indicates the position so determined;

a communication interface configured to enable establishment of or connection to a wireless network that includes a computing device; and a control component configured to control the aerosol delivery device to produce an aerosol from the aerosol precursor composition;

wherein the control component comprises a microprocessor configured to receive the message and cause the communication interface to wirelessly communicate the position of the aerosol delivery device to the computing device, the microprocessor remotely controllable by the computing device to control operation of the aerosol delivery device based on the position as wirelessly communicated to the computing device.

8. The control body of claim 7, wherein the satellite navigation receiver module configured to determine the position of the control body includes the satellite navigation receiver module configured to determine the position, a velocity and a time at the control body, and wherein the message output by the satellite navigation receiver module and received by the microprocessor indicates the position, the velocity and the time, and the microprocessor is configured to cause the communication interface to wirelessly communicate the position, the velocity and the time to the computing device.

9. The control body of claim 7, wherein the control body further comprises an indicator, and the satellite navigation receiver module is further configured to output a position available signal that is distinct from the message, the position available signal output to the indicator to cause the indicator to provide a user-perceptible feedback that indicates availability of the position of the control body.

10. The control body of claim 7, wherein the control body further comprises an indicator, and the control component is further configured to control the indicator to provide a user-perceptible feedback that indicates the position of the control body.

11. The control body of claim 7, wherein the wireless network is a wireless personal area network (WPAN), and the communication interface is configured to enable establishment of or connection to the WPAN that includes the computing device.

12. The control body of claim 7, further comprising power harvesting circuitry configured to receive and harvest power from the corresponding electronic signals to power or charge a power source configured to power at least the satellite navigation receiver module and microprocessor.

13. The aerosol delivery device of claim 1, wherein the microprocessor is configured to cause the communication interface to wirelessly communicate the position of the aerosol delivery device to the computing device to enable the computing device to control operation of the computing device based on the position of the aerosol delivery device.

14. The aerosol delivery device of claim 1, wherein the microprocessor is remotely controllable by the computing device to alter a power state of the aerosol delivery device.

15. The control body of claim 7, wherein the microprocessor is configured to cause the communication interface to wirelessly communicate the position of the control body to the computing device to enable the computing device to control operation of the computing device based on the position of the control body.

16. The control body of claim 7, wherein the microprocessor is remotely controllable by the computing device to alter a power state of the control body.

17. The aerosol delivery device of claim 1, wherein the satellite navigation receiver module and microprocessor are embodied by distinct integrated circuits coupled by at least one conductor onto which the message is output by the satellite navigation receiver module and from which the message is received by the microprocessor.

18. The control body of claim 7, wherein the satellite navigation receiver module and microprocessor are embodied by distinct integrated circuits coupled by at least one conductor onto which the message is output by the satellite navigation receiver module and from which the message is received by the microprocessor.

* * * * *